United States Patent [19]

Daitoku

[11] 4,385,735
[45] May 31, 1983

[54] MOTOR DRIVE DEVICE FOR A LONG FILM
[75] Inventor: Koichi Daitoku, Sagamihara, Japan
[73] Assignee: Nippon Kogaku K. K., Tokyo, Japan
[21] Appl. No.: 212,623
[22] Filed: Dec. 3, 1980
[30] Foreign Application Priority Data
Dec. 17, 1979 [JP] Japan .................... 54-173438
[51] Int. Cl.³ .............................................. G03B 1/04
[52] U.S. Cl. .................................. 242/71.1; 354/212
[58] Field of Search ........................... 242/71–71.6; 354/212–216

[56] References Cited

U.S. PATENT DOCUMENTS

| Re. 26,181 | 4/1967 | Harvey et al. | 242/71 X |
| 1,201,002 | 10/1916 | Treadaway et al. | 242/71.5 |
| 1,501,677 | 7/1924 | McMahon | 242/71.5 X |
| 2,581,691 | 1/1952 | Moomaw et al. | 242/71 |
| 3,491,957 | 1/1970 | Sawada et al. | 242/71.5 |
| 3,651,747 | 3/1972 | Kimura | 354/212 |
| 3,679,148 | 7/1972 | Daitoku et al. | 242/71.6 |
| 3,783,762 | 1/1974 | Sugimori | 242/71.6 X |
| 4,145,011 | 3/1979 | Date | 242/71.6 |

Primary Examiner—John M. Jillions
Attorney, Agent, or Firm—Shapiro and Shapiro

[57] ABSTRACT

A motor drive device for a long film which is provided with a take-up shaft having a coupling portion at one end thereof and an extraneously operable take-up knob at the other end thereof and in which the engagement and disengagement between the spool shaft in a film magazine and the coupling portion is made possible by axial sliding movement of the take-up shaft and film take-up is effected by rotating the take-up shaft by a motor has a biasing member for normally biasing the take-up shaft in a direction in which the coupling portion engages the spool shaft.

3 Claims, 2 Drawing Figures

MOTOR DRIVE DEVICE FOR A LONG FILM

BACKGROUND OF THE INVENTION

1. Field of the Invention

This invention relates to a long-film motor drive device which contains in a motor drive body a magazine containing a film light-tightly therein and effects film take-up.

2. Description of the Prior Art

Devices for moving a take-up shaft upwardly and downwardly to effect the engagement and disengagement thereof with the shaft of a film take-up spool which is a driven member have heretofore been grouped into the type in which the upward and downward movement of the take-up shaft is automatically effected and the type in which the upward and downward movement of the take-up shaft is manually effected. The former is reliable because the engagement and disengagement between the take-up shaft and the spool shaft is also automatically effected by the rotation of a drive member while, on the other hand, it has disadvantages that the mechanism is complicated and that when the engagement between the take-up shaft and the spool shaft is effected, some time is required from after the drive member has started its operation until the engagement is accomplished. The latter has no such disadvantages. The present invention relates to the device of the type in which the take-up shaft is manually moved up and down. Heretofore, the device in which the take-up shaft is manually moved up and down has been provided a click stop mechanism for enabling it to be confirmed that the take-up shaft has come to its regular position when the claw of the spool shaft in the magazine has completely engaged the coupling at one end of the take-up shaft and for preventing the take-up shaft from inadvertently moving down. However, in a long film motor drive device, film take-up is effected by moving the take-up shaft downwardly to take out the magazine, containing a magazine loaded with a new film into the motor drive device, moving the take-up shaft upwardly to thereby bring the coupling into engagement with the claw of the spool shaft, and rotating the spool by the rotation of the drive member. Therefore, if the motor drive device is operated without moving the take-up shaft to its upper regular position (in other words, a position in which the take-up shaft is held at its regular contained position by the click stop mechanism), the shaft will be lowered by repeated vibration or the like and the engagement between the claw and the coupling will be broken, so that the shaft connected to the drive side will rotate but the spool will not rotate and the film will not be taken up and thus, the film will slacken in the intermediate portion thereof and at last, the film will cause jamming, thereby making film take-up and photography impossible.

SUMMARY OF THE INVENTION

According to the present invention, in order to prevent the thus manually operable take-up shaft from being used without being moved up to its regular position, a spring for always biasing the take-up shaft upwardly (namely, in the direction in which the coupling of the take-up shaft engages the claw of the spool is provided, whereby when the hand is released from the knob of the take-up shaft, the coupling comes into mesh engagement with the claw, and the object of the present invention is to eliminate the disadvantage peculiar to the conventional device that even if the drive member is rotated, the spool is not rotated and accordingly the film is not taken up.

The invention will become fully apparent from the following detailed description thereof taken in conjunction with the accompanying drawings.

DESCRIPTION OF THE PREFERRED EMBODIMENTS

Embodiments of the present invention will hereinafter be described with reference to the drawings.

Figure 1:
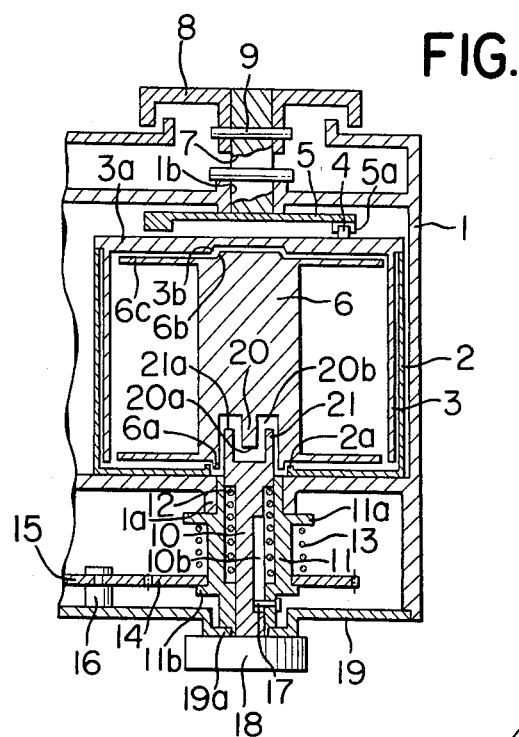
FIG. 1 is a vertical cross-sectional view of the take-up side of the long film motor drive device according to the present invention.

In FIG. 1, reference numeral 1 designates a motor drive body, and reference numeral 2 denotes an outer cylinder of a magazine for light-tightly containing a film. The outer cylinder 2 has in the outer periphery thereof an opening portion (not shown) through which the film may pass, and one end of the outer cylinder forms the bottom of the magazine, and the center thereof has a bearing portion 2a for supporting the projection 6a of a spool 6 on which the film is wound. The spool 6 has on its opposite ends flanges 6c for controlling the film to a predetermined position. The inner cylinder 3 of the magazine has in a portion of the outer periphery thereof an opening portion (not shown) through which the film may pass, and a path for the film if formed by combining the opening portion of the outer cylinder 2 and the opening portion of the inner cylinder 3, and the magazine is made light-tight by relatively rotating and deviating the two opening portions with respect to each other. One end 3a of the inner cylinder 3 forms the lid portion of the magazine and the center thereof has a bearing portion 3b for supporting the shaft portion 6b of the spool 6. Said one end 3a of the inner cylinder 3 also has a connecting pin 4, and a magazine rotating shaft 7 supported by the bearing portion 1b of the motor drive body 1 has a magazine receptacle 5 secured to one end thereof, and a recess 5a at a portion of the magazine receptacle 5 is engaged by the connecting pin 4 to transmit the rotation of the magazine receptacle 5 to the inner cylinder 3, and the magazine may be opened and closed by adjusting or deviating the opening portions of the inner cylinder 3 and outer cylinder 2 with respect to each other.

A knob 8 for opening and closing the magazine is fixed to the rotating shaft 7 by means of a pin 9, and the opening and closing of the magazine may be effected by manually rotating the knob 8.

A take-up guide ring 11 has the opposite ends thereof supported by the bearing portion 1a of the motor drive body 1 and the bearing portion 19a of a bottom lid 19, and has flange portions 11a and 11b. A take-up shaft 10 movable up and down by the take-up guide ring 11 has at one end thereof a coupling 21 meshing with the claw 20 of the spool and has at the other end thereof a take-up knob 18 outwardly projected for manually moving the take-up shaft 10 up and down. The take-up shaft 10 has a guide groove 10b and is movable up and down relative to the take-up guide ring 11 by a pin 17 studded in the take-up guide ring 11, and may be rotated with the guide ring 11 in the direction of rotation. A spring 12 imparts a force in a direction to repel the take-up guide ring 11 and the take-up shaft 10 with respect to each other, and normally imparts a force to cause the coupling 21 to mesh with the claw 20.

A take-up gear 14 is supported for rotation about the take-up guide ring 11 and has its sliding movement in the thrust direction controlled by one flange 11b of the take-up guide ring, and a friction force is imparted to between the take-up gear 14 and the flange 11b by a spring 13 acting between another flange 11a and the take-up gear 14. Thus, when the diameter of the spool becomes greater and the amount of film taken up exceeds a required amount, sliding may be caused therebetween so as not to pull the film excessively.

A driving gear 15 meshes with the take-up gear 14 to transmit the rotational force from the micromotor (not shown) of the motor drive device. Designated by 16 is the rotary shaft of the driving gear 15.

With the above-described construction, if the magazine is taken out by manually moving the take-up knob 18 downwardly and the magazine is again contained and the hand is released from the lowered take-up knob 18, the coupling 21 will naturally and reliably mesh with the claw 20 of the spool to enable the rotational force of the driving gear to be transmitted to the spool.

Also, even if, when the take-up shaft 10 is moved upwardly by the spring 12, the upper end 21a of the coupling 21 strikes against the lower end 20a of the claw 20 and the coupling 21 does not mesh with the claw 20, the coupling may drop into a groove 20b and mesh with the claw 20 if the driving gear 15 is rotated.

Figure 2:
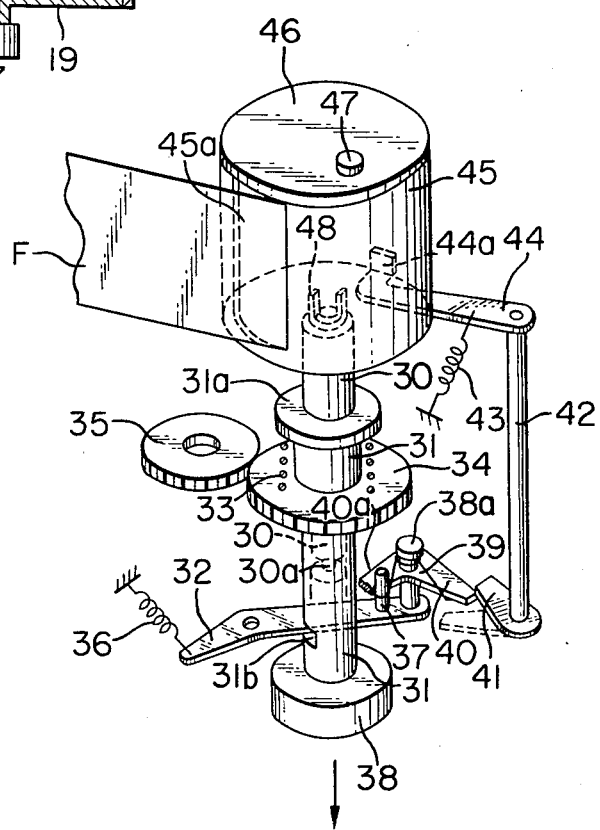
FIG. 2 is a perspective view of another embodiment of the present invention in which a device for holding the take-up shaft is added to the embodiment of FIG. 1.

FIG. 2 shows an improvement over the embodiment of FIG. 1. In the embodiment of FIG. 1, when the take-up shaft is lowered to take the magazine in and out, the take-up knob 18 must be held in this means a difficulty in operation. In view of this, in the embodiment of FIG. 2, a mechanism for holding the position of the take-up shaft 10 when lowered is added.

In FIG. 2, reference numeral 45 designates the outer cylinder of the magazine, reference numeral 45a designates an opening portion of the outer cylinder, reference numeral 46 denotes the inner cylinder of the magazine, reference numeral 47 designates a connecting pin meshing with the magazine receptacle 5, and F denotes a film. A take-up shaft 30 has a stepped portion 30a, and one end thereof has a coupling 48 meshing with the claw 20 of the spool and the other end thereof has a take-up knob 38 of a manual operating member.

A force is imparted to between the take-up shaft 30 and a take-up guide ring 31 by an unshown spring similar to the spring 12 of FIG. 1, and the take-up shaft 30 is movable up and down relative to the take-up guide ring 31 and rotatable with the take-up guide ring 31.

The guide ring 31 has a flange 31a which, with a spring 33 and a take-up gear 34, frictionally transmits the rotational force of a driving gear 35 to the take-up guide ring 31, as in the embodiment of FIG. 1.

The take-up guide ring 31 also has a partly cut-away portion 31b, through which a limit lever 32 is engageable with the stepped portion 30a of the take-up shaft 30.

A riser portion 44a at one end of a magazine detecting lever 44 constitutes a magazine sensing member and the other end thereof is secured to a transmission shaft 42. A release lever 41 is secured to one end of the transmission shaft 42, and the magazine detecting lever 44 and the release lever 41 rotate together.

Designated by 43 is a restitution spring for said two levers.

The limit lever 32 is rotatively biased in clockwise direction by a spring 36, but when the take-up shaft is not lowered downwardly (in the direction of arrow) to a predetermined position, the limit lever is limited by the peripheral surface of the take-up shaft 30 and does not limit the upward and downward mevement of the take-up shaft.

When the take-up shaft 30 is lowered to a predetermined position by operating the take-up knob 38, the stepped portion 30a comes into the pivotal movement locus of the limit lever 32, so that the limit lever 32 is rotated clockwisely and comes into the stepped portion 30a to limit the upward and downward movement of the take-up shaft 30. A clutch lever 40 is pivotably studded in one end of the limit lever 32 by a shaft 38a and is rotatively biased in counter-clockwise direction by a spring 39. A pin 37 for limiting the rotation of the clutch lever 40 is studded in the limit lever 32.

Operation from the condition of FIG. 2 will now be described. When the take-up shaft 30 is lowered against the force of the unshown spring corresponding to the spring 12 of FIG. 1 by manually operating the take-up knob 38, the limit lever 32 comes into the stepped portion 30a to limit the upward movement of the take-up shaft. Next, when the magazine is taken out, the magazine detecting lever 44 and the release lever 41 are counter-clockwisely rotated and the release lever 41 rides over the clutch lever 40 while rotating the latter clockwisely, and moves to a position indicated by dotted line. On the other hand, when the release lever 41 comes to its dotted-line position, the clutch lever 40 becomes disengaged from the release lever 41 and returns to its position shown. In this operation, the limit lever 32 does not move.

Next, when the magazine is inserted, the magazine detecting lever 44 is rotated clockwisely and the end of the release lever 41 pushes the clutch lever 40. Accordingly, the limit lever 32 is rotated counter-clockwisely and becomes disengaged from the stepped portion 30a, and the take-up shaft 30 is moved upwardly by the force of a spring, not shown, and the coupling 48 provided at the end of the take-up shaft 30 meshes with the claw of the spool of the magazine.

According to the present invention, the take-up shaft is biased so that the claw of the spool is always in mesh engagement with the coupling and therefore, after the insertion of the magazine, the connection between the drive member and the take-up spool can be easily and reliably accomplished without the possibility of malfunctioning.

If the present invention is constructed as shown in the embodiment of FIG. 2, the taking in and out of the magazine will become easy.

I claim:

1. A film winding apparatus having a receiving body for receiving a film magazine containing a film spool to be rotated therein, a take-up shaft in said body having a free end provided with a coupling for engaging with said spool from outside of the magazine, the shaft being axially movable between a first position for engaging the coupling with the spool and a second position for disengaging the coupling from the spool, rotation of the take-up shaft being transmitted to the spool when the shaft is in the first position for driving spool, holding means in said body for holding the take-up shaft in the second position, sensing means in said body for detecting the presence of a film magazine therein, and moving means operated by the sensing means for releasing the holding means and displacing the take-up shaft from the second position to the first position responsive to the detection of a film magazine within the receiving body.

2. A film winding apparatus according to claim 1, wherein the moving means comprises biasing means for urging the take-up shaft to move from the second position to the first position, and release means for releasing the holding means in response to the detection of a magazine by the sensing means thereby allowing movement of the take-up shaft from the second position to the first position by the biasing means.

3. A film winding apparatus according to claim 1, wherein the sensing means comprises a sensing member and a biasing member which urges the sensing member into a position in which it will be moved by a film magazine when the magazine is inserted into the receiving body, thereby operating the moving means.

* * * * *